United States Patent
Yamasaki (10) Patent No.: US 9,706,095 B2
(45) Date of Patent: Jul. 11, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Shinji Yamasaki, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/190,049

(22) Filed: Jun. 22, 2016

(65) Prior Publication Data
US 2017/0003480 A1    Jan. 5, 2017

(30) Foreign Application Priority Data
Jun. 30, 2015  (JP) .................................. 2015-132145

(51) Int. Cl.
| | |
|---|---|
| *G02B 15/14* | (2006.01) |
| *H04N 5/225* | (2006.01) |
| *G03B 13/34* | (2006.01) |
| *G02B 15/173* | (2006.01) |

(52) U.S. Cl.
CPC ......... *H04N 5/2254* (2013.01); *G02B 15/173* (2013.01); *G03B 13/34* (2013.01); *G03B 2205/0046* (2013.01)

(58) Field of Classification Search
CPC .... G02B 15/173; G02B 15/20; G02B 27/646; G02B 15/14; G02B 13/009; G02B 15/16; G02B 27/0025; G02B 15/177; G02B 13/18; G02B 15/17; G02B 15/163; G02B 13/0045; G02B 15/22; G02B 15/161; G02B 5/005; G02B 7/10; G02B 9/60

USPC ........ 359/683–685, 700–715, 691, 717, 740, 359/649–651, 687
See application file for complete search history.

(56) References Cited

FOREIGN PATENT DOCUMENTS

| | | | |
|---|---|---|---|
| JP | 2005-55625 | * | 3/2005 |
| JP | 2005-055625 | | 3/2005 |

OTHER PUBLICATIONS

JPO 2005-55625 English machine translation.*

* cited by examiner

*Primary Examiner* — Scott J Sugarman
*Assistant Examiner* — Sharrief Broome
(74) *Attorney, Agent, or Firm* — Canon USA, Inc. I.P. Division (57) ABSTRACT

In a zoom lens including, in order from an object side to an image side, a first lens unit having a positive refractive power, a second lens unit having a negative refractive power, a third lens unit having a positive refractive power, and a fourth lens unit having a positive refractive power, an appropriate setting is performed for each of the following: a movement locus for each lens unit; lateral magnifications $\beta 34w$ and $\beta 34t$ of a composite lens system of the third lens unit and the fourth lens unit at a wide angle end and at a telephoto end, respectively; lateral magnifications $\beta 2w$ and $\beta 2t$ of the second lens unit at the wide angle end and at the telephoto end, respectively; and lateral magnifications $\beta 3w$ and $\beta 3t$ of the third lens unit at the wide angle end and at the telephoto end, respectively.

13 Claims, 7 Drawing Sheets

ZOOM LENS AND IMAGE PICKUP APPARATUS INCLUDING THE SAME

BACKGROUND OF THE INVENTION

Field of the Invention

The present disclosure relates to a zoom lens and an image pickup apparatus including the same, and is suitable to an image pickup apparatus using an image pickup element such as a digital still camera, a video camera, a monitoring camera, and a broadcast camera, or an image pickup apparatus such as a camera using a silver-halide photographic film.

Description of the Related Art

Recently, functions of image pickup apparatuses such as a monitoring camera and a video camera using a solid-state image pickup element have been advanced, and the overall sizes thereof have been reduced. Zoom lenses used for these apparatuses are required to have a small size, a high zoom ratio, and excellent optical performance. In addition, the zoom lenses are required to have a wider view angle in order to enable one image pickup apparatus to perform shooting over a wider range.

A zoom lens is known which includes, in order from an object side to an image side, a lens unit having a positive refractive power, a lens unit having a negative refractive power, a lens unit having a positive refractive power, a lens unit having a positive refractive power, and a lens unit having a positive refractive power, for the purpose of meeting the requirements.

In Japanese Patent Application Laid-Open No. 2005-55625, a zoom lens is disclosed in which a wide view angle is achieved while reducing distortion aberration and astigmatism by locating a negative lens having a strong concave surface to be closest to an object-side end in a second lens unit.

However, with the zoom lens disclosed in Japanese Patent Application Laid-Open No. 2005-55625, it is difficult to sufficiently achieve an increase in magnification and a wide view angle since magnification varying burdens of the second, a third, and a fourth lens units are relatively small.

SUMMARY OF THE INVENTION

The zoom lens according to the present disclosure includes, in order from an object side to an image side, a first lens unit having a positive refractive power, a second lens unit having a negative refractive power, a third lens unit having a positive refractive power, and a fourth lens unit having a positive refractive power, in which a distance between adjacent lens units varies when performing zooming. When zooming is performed, the first lens unit is configured not to be moved, and at least the second lens unit and the third lens unit are configured to be moved. When a lateral magnification of a composite lens system of the third lens unit and the fourth lens unit at a wide angle end is denoted by $\beta 34w$, a lateral magnification of the composite lens system of the third lens unit and the fourth lens unit at a telephoto end is denoted by $\beta 34t$, a lateral magnification of the second lens unit at the wide angle end is denoted by $\beta 2w$, a lateral magnification of the second lens unit at the telephoto end is denoted by $\beta 2t$, a lateral magnification of the third lens unit at the wide angle end is denoted by $\beta 3w$, and a lateral magnification of the third lens unit at the telephoto end is denoted by $\beta 3t$, the zoom lens satisfies the following conditional expressions:

$$2.20 < (\beta 34t/\beta 34w)/(\beta 2t/\beta 2w) < 15.00,$$

$$3.40 < \beta 3t/\beta 3w < 18.00, \text{ and}$$

$$-0.15 < \beta 2w < -0.01.$$

According to other aspects of the present disclosure, one or more additional zoom lenses, one or more image pickup apparatuses and one or more methods for use with same are discussed herein. Further features of the present disclosure will become apparent from the following description of exemplary embodiments with reference to the attached drawings.

DESCRIPTION OF THE EMBODIMENTS

Hereinafter, a zoom lens according to the present disclosure and an image pickup apparatus including the same will be described in detail based on the accompanied drawings. The zoom lens according to the present disclosure includes, in order from an object side to an image side, a first lens unit having a positive refractive power, a second lens unit having a negative refractive power, a third lens unit having a positive refractive power, and a fourth lens unit having a positive refractive power. Here, the lens unit means a lens element integrally moved when performing zooming. The lens unit may include one or more lenses, and may not necessarily include a plurality of lenses.

Figure 1:
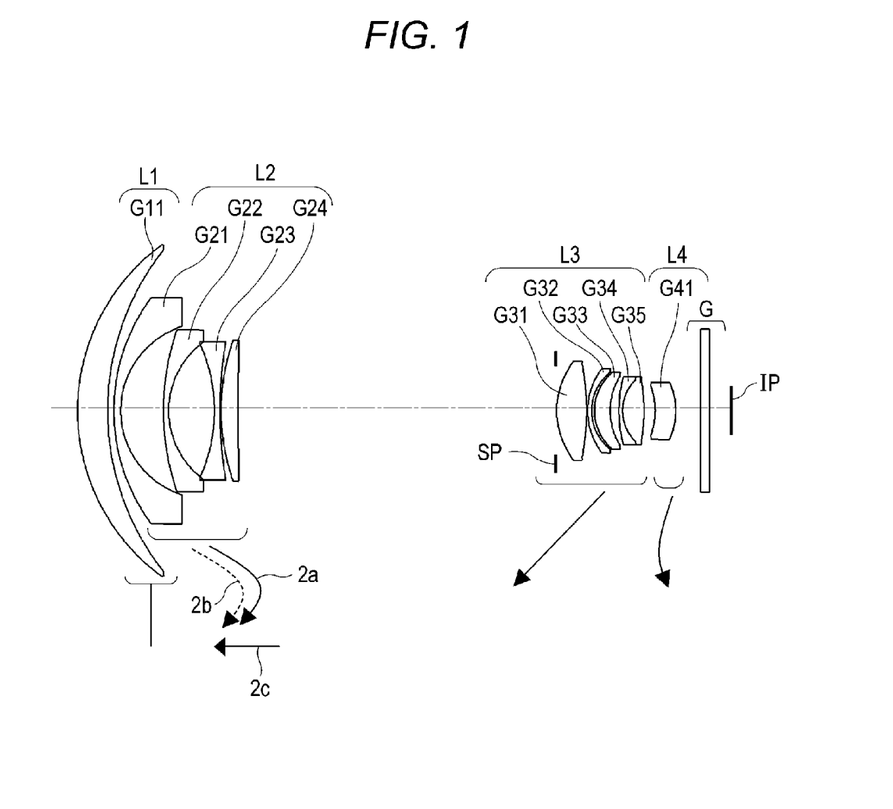
FIG. 1 is a cross-sectional view of a zoom lens according to a first embodiment at a wide angle end.
Figure 2A:
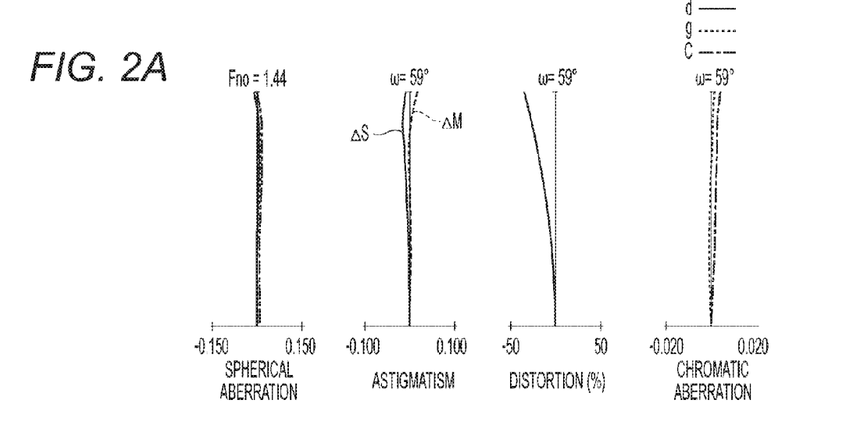
FIGS. 2A, 2B, and 2C are aberration diagrams of the zoom lens according to the first embodiment at the wide angle end, an intermediate zooming position, and a telephoto end, respectively.
Figure 2B:
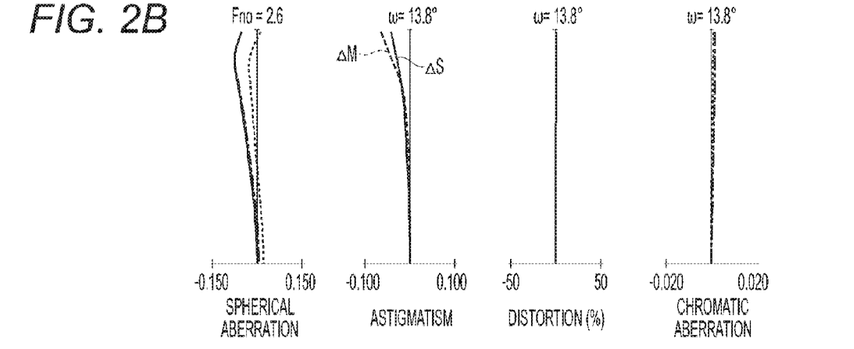
Figure 2C:
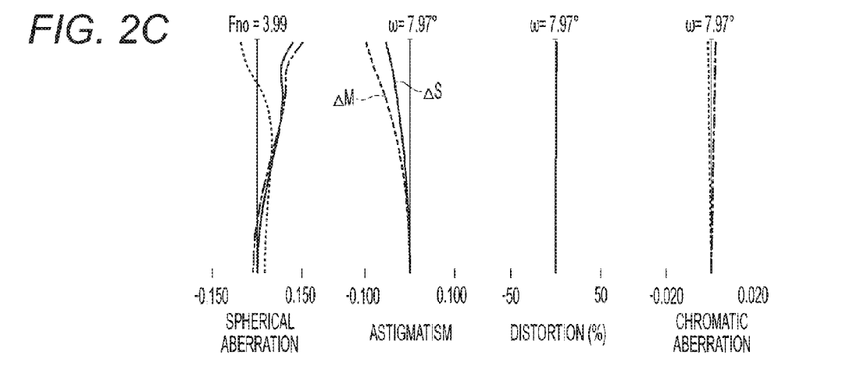
Figure 3:
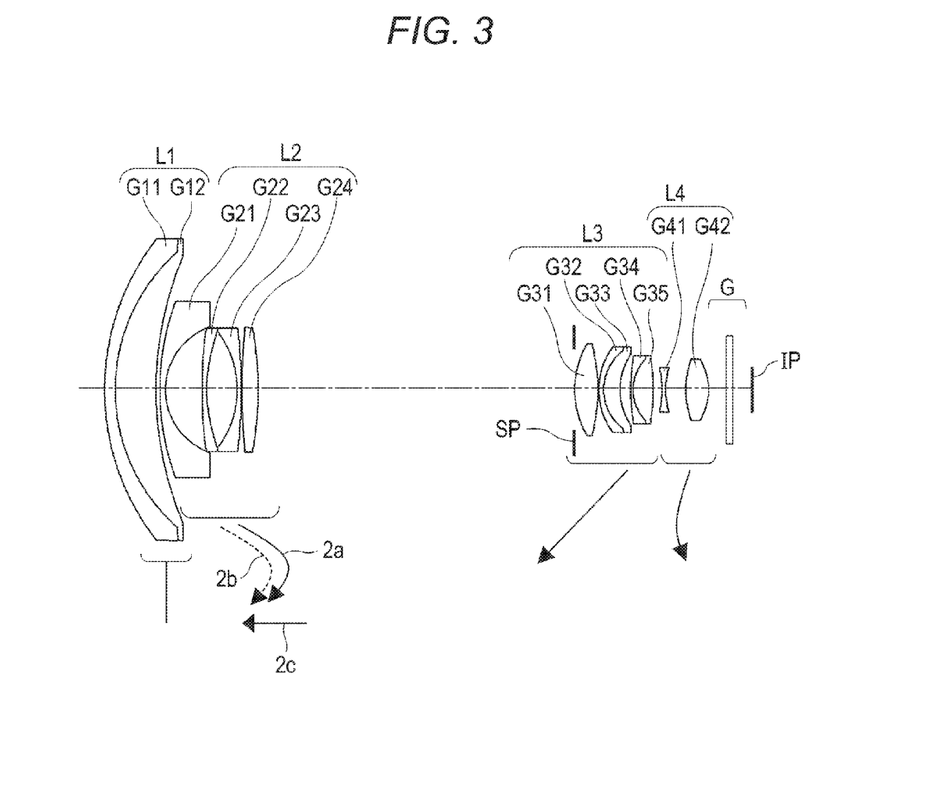
FIG. 3 is a cross-sectional view of a zoom lens according to a second embodiment at a wide angle end.
Figure 4A:
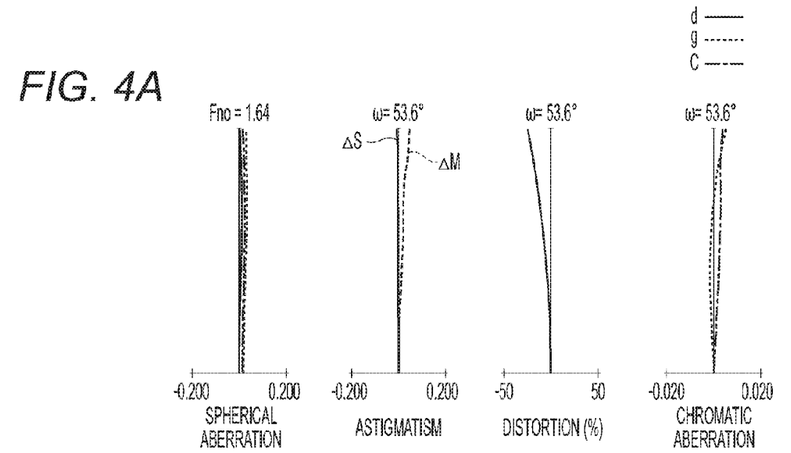
FIGS. 4A, 4B, and 4C are aberration diagrams of the zoom lens according to the second embodiment at the wide angle end, an intermediate zooming position, and a telephoto end, respectively.
Figure 4B:
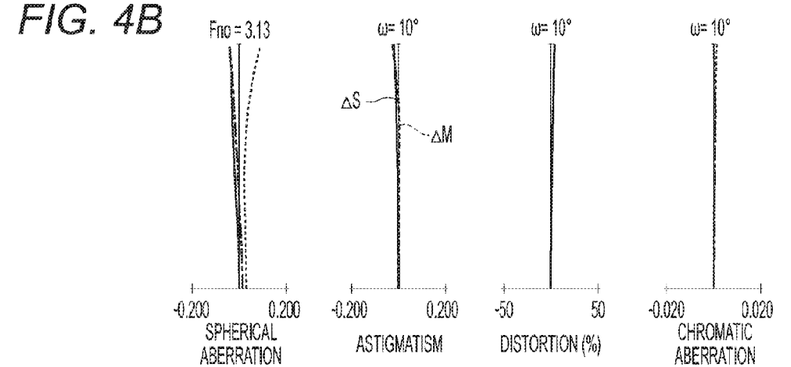
Figure 4C:
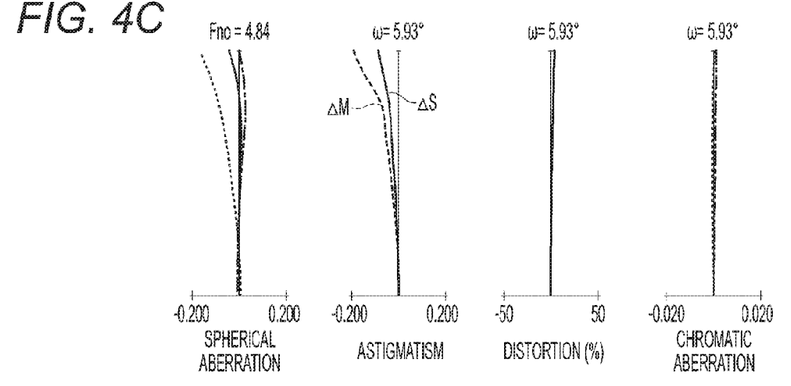

FIG. 1 is a cross-sectional view of a zoom lens according to a first embodiment at a wide angle end. FIGS. 2A, 2B, and 2C are aberration diagrams of the zoom lens according to the first embodiment at the wide angle end, an intermediate zooming position, and a telephoto end, respectively. Regarding the zoom lens according to the first embodiment, a zoom ratio is 7.7, and an F-number is about 1.44 to 3.99. FIG. 3 is a cross-sectional view of a zoom lens according to a second embodiment at a wide angle end. FIGS. 4A, 4B, and 4C are aberration diagrams of the zoom lens according to the second embodiment at the wide angle end, an intermediate zooming position, and a telephoto end, respectively. Regarding the zoom lens according to the second embodiment, a zoom ratio is 9.5, and an F-number is about 1.64 to 4.84.

Figure 5:
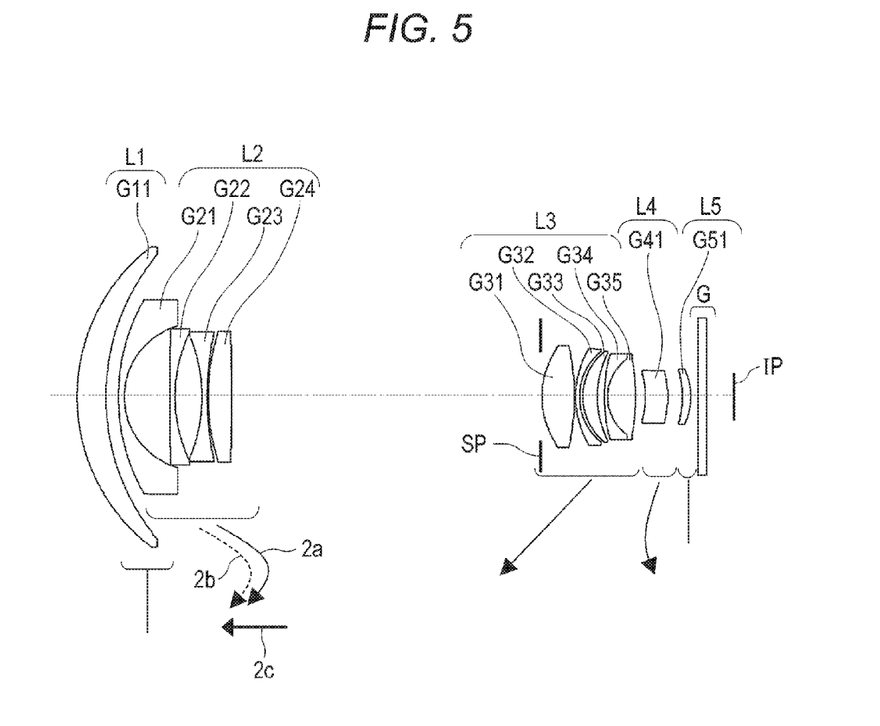
FIG. 5 is a cross-sectional view of a zoom lens according to a third embodiment at a wide angle end.
Figure 6A:
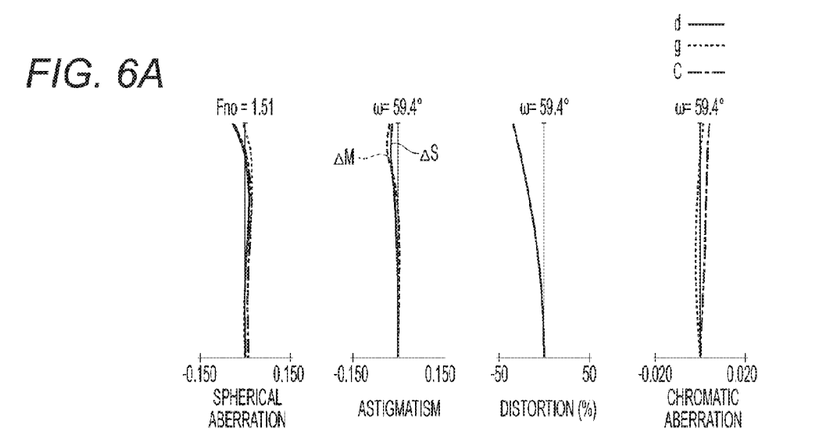
FIGS. 6A, 6B, and 6C are aberration diagrams of the zoom lens according to the third embodiment at the wide angle end, an intermediate zooming position, and a telephoto end, respectively.
Figure 6B:
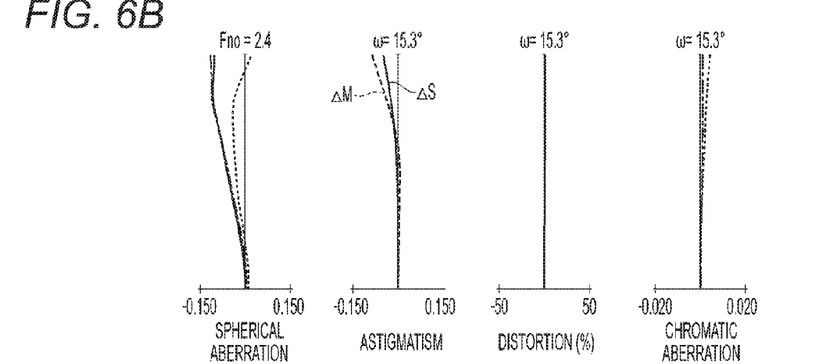
Figure 6C:
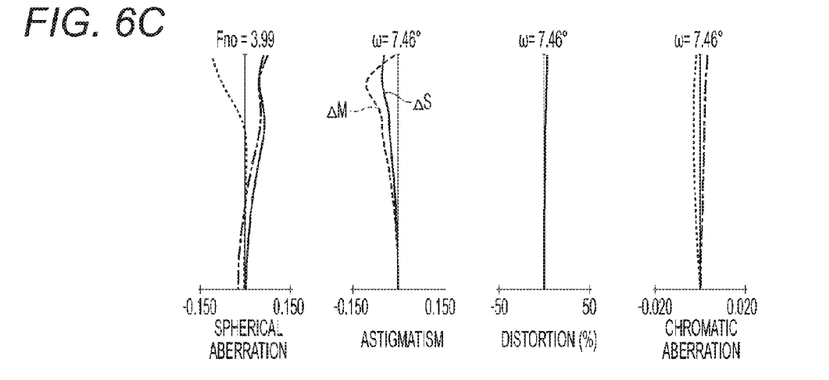

FIG. 5 is a cross-sectional view of a zoom lens according to a third embodiment at a wide angle end. FIGS. 6A, 6B, and 6C are aberration diagrams of the zoom lens according to the third embodiment at the wide angle end, an intermediate zooming position, and a telephoto end, respectively. Regarding the zoom lens according to the third embodiment, a zoom ratio is 8.2, and an F-number is about 1.51 to 3.99.

Figure 7:
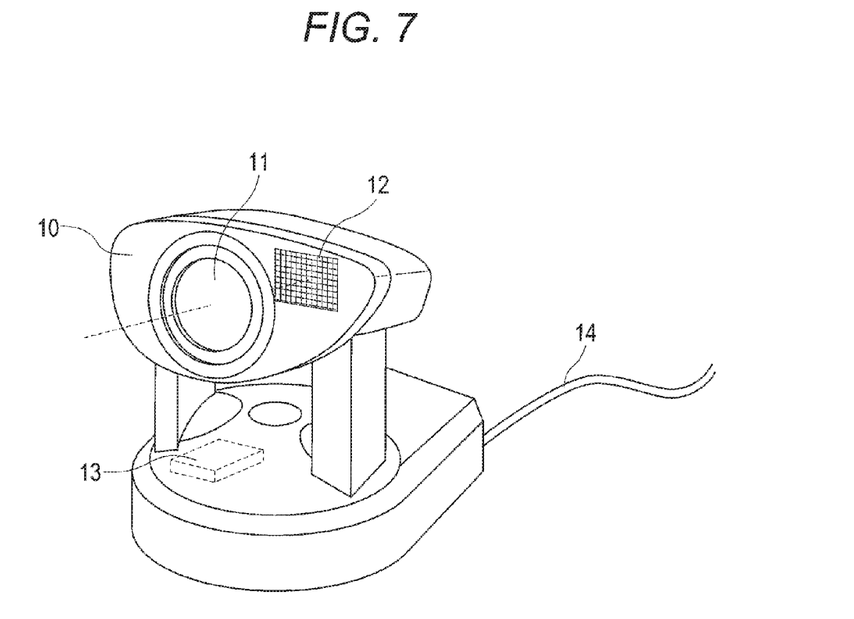
FIG. 7 is a view schematically illustrating main parts of an image pickup apparatus according to the present disclosure.

FIG. 7 is a view schematically illustrating main parts of a monitoring camera (image pickup apparatus) including the zoom lens according to the present disclosure. The zoom lens according to each of the embodiments is an image pickup lens system used for an image pickup apparatus such as a digital still camera, a video camera, a monitoring camera, and a broadcast camera. In each cross-sectional view of the lens, an object resides on the left side, and an image resides on the right side. In addition, when an order of a lens unit counted from the object side to the image side is denoted by i in each cross-sectional view of the lens, Li denotes an i-th lens unit.

Each of the zoom lenses according to the first and the second embodiments consists of a first lens unit L1 having a positive refractive power, a second lens unit L2 having a negative refractive power, a third lens unit L3 having a positive refractive power, and a fourth lens unit L4 having a positive refractive power. Each of the zoom lenses according to the first and the second embodiments is a positive lead-type four-unit zoom lens consisting of four lens units.

The zoom lens according to the third embodiment consists of a first lens unit L1 having a positive refractive power, a second lens unit L2 having a negative refractive power, a third lens unit L3 having a positive refractive power, a fourth lens unit L4 having a positive refractive power, and a fifth lens unit L5 having a positive refractive power. The zoom lens according to the third embodiment is a positive lead-type five-unit zoom lens consisting of five lens units.

In each embodiment, SP denotes an aperture stop. In each embodiment, the aperture stop SP is located between the second lens unit L2 and the third lens unit L3. In each embodiment, the aperture stop SP moves along the same locus as that of the third lens unit L3 when zooming is performed. As a result, a structure of a lens barrel for supporting the zoom lens can be simplified.

G denotes an optical block corresponding to an optical filter, a face plate, a low-pass filter, an infrared cut filter, and the like. IP denotes an image plane. When the zoom lens is used as an image pickup optical system of a video camera or a monitoring camera, the image plane IP corresponds to a solid-state image pickup element (photoelectric conversion element) such as a CCD sensor and a CMOS sensor. When the zoom lens is used as an image pickup optical system of a silver-halide film camera, the image plane IP corresponds to a film surface.

In each of the spherical aberration diagrams, Fno denotes an F-number, and spherical aberrations with respect to a C-line (wavelength: 656.3 nm), a d-line (wavelength: 587.6 nm), and a g-line (wavelength: 435.8 nm) are illustrated. In each of the astigmatism diagrams, ΔS denotes a sagittal image plane, and ΔM denotes a meridional image plane. Distortion aberration is illustrated with respect to the d-line. In each of the chromatic aberration diagrams, chromatic aberrations with respect to the C-line and the g-line are illustrated. ω denotes an image pickup half angle of view.

In each of the embodiments, as illustrated by arrows in the cross-sectional view of the lens, the lens units are moved when zooming is performed from the wide angle end to the telephoto end, and a distance between adjacent lens units varies. Specifically, in each of the embodiments, when zooming is performed from the wide angle end to the telephoto end, the first lens unit L1 is not moved. The second lens unit L2 is moved along a locus convex toward the image side. In other words, when zooming is performed from the wide angle end to the telephoto end, the second lens unit L2 is moved toward the image side, and then toward the object side. The third lens unit L3 is moved monotonously toward the object side. The fourth lens unit L4 is moved so as to be located closer to the image-side end at the telephoto end than at the wide angle end. In the zoom lens according to the third embodiment, the fifth lens unit L5 is not moved when zooming is performed.

In the zoom lens according to each of the embodiments, a distance between the first lens unit L1 and the second lens unit L2 widens and a distance between the second lens unit L2 and the third lens unit L3 narrows at the telephoto end in comparison to at the wide angle end. Consequently, an increase in magnification of the zoom lens can be efficiently achieved. In addition, a distance between the third lens unit L3 and the fourth lens unit L4 widens at the telephoto end in comparison to at the wide angle end. In the zoom lens according to the third embodiment, a distance between the fourth lens unit L4 and the fifth lens unit L5 narrows at the telephoto end in comparison to at the wide angle end.

In addition, in the zoom lens according to each of the embodiments, the second lens unit L2 is used as a focusing unit. When focusing is performed in a telephoto end from an object at infinity to a near object, the second lens unit L2 is moved toward the object side as illustrated by an arrow 2c in each cross-sectional view of the lens. In each cross-sectional view of the lens, a solid line 2a and a dotted line 2b represent movement loci for correcting an image plane variation accompanying zooming from the wide angle end to the telephoto end, when focusing on an object at infinity and a near object, respectively.

In addition, in the zoom lens according to each of the embodiments, image blur can be corrected by moving a lens unit or a lens such that the lens unit or the lens includes a component in a direction perpendicular to an optical axis.

In each of the embodiments, when a lateral magnification of a composite lens system of the third lens unit L3 and the fourth lens unit L4 at the wide angle end is denoted by β34w, a lateral magnification of the composite lens system of the third lens unit L3 and the fourth lens unit L4 at the telephoto end is denoted by β34t, a lateral magnification of the second lens unit L2 at the wide angle end is denoted by β2w, a lateral magnification of the second lens unit L2 at the telephoto end is denoted by β2t, a lateral magnification of the third lens unit L3 at the wide angle end is denoted by β3w, and a lateral magnification of the third lens unit L3 at the telephoto end is denoted by β3t, the zoom lens satisfies the following conditional expressions:

$$2.20 < (\beta 34t/\beta 34w)/(\beta 2t/\beta 2w) < 15.00 \tag{1}$$

$$3.40 < \beta 3t/\beta 3w < 18.00 \tag{2}$$

$$-0.15 < \beta 2w < -0.01 \tag{3}$$

The conditional expression (1) defines magnification varying burdens of the second lens unit L2 and the composite lens system of the third lens unit L3 and the fourth lens unit L4. In the present disclosure, an increase in magnification of the zoom lens is achieved by increasing the magnification varying burden of the composite lens system of the third lens unit L3 and the fourth lens unit L4.

In a case where the magnification varying burden of the composite lens system of the third lens unit L3 and the fourth lens unit L4 increases and exceeds the upper limit of the conditional expression (1), moving amounts of the third lens unit L3 and the fourth lens unit L4 increase when zooming is performed, and thereby the size of the whole system may increase. Accordingly, such a case is not preferable. In a case where the magnification varying burden of the composite lens system of the third lens unit L3 and the fourth lens unit L4 decreases beyond the lower limit of the conditional expression (1), it is necessary to increase the magnification varying burden of the second lens unit L2 to achieve an increase in magnification. In order to increase the magnification varying burden of the second lens unit L2, it is necessary to locate the second lens unit L2 to be closer to the object-side end at the wide angle end. As a result, the effective diameter of the front lens increases. Accordingly, such a case is not preferable.

The conditional expression (2) defines a magnification varying burden of the third lens unit L3. In a case where the magnification varying burden of the third lens unit L3 increases and exceeds the upper limit of the conditional expression (2), a moving amount of the third lens unit L3 increases when zooming is performed, and thereby the size of the whole system may increase. Accordingly, such a case is not preferable. In a case where the magnification varying burden of the third lens unit L3 decreases beyond the lower limit of the conditional expression (2), it is difficult to sufficiently achieve an increase in magnification. Accordingly, such a case is not preferable.

The conditional expression (3) defines a lateral magnification β2w of the second lens unit L2 at the wide angle end. In a case where the lateral magnification β2w of the second lens unit L2 at the wide angle end increases and exceeds the upper limit of the conditional expression (3), a lot of lateral chromatic aberrations and field curvature occur. Accordingly, such a case is not preferable. In a case where the lateral magnification β2w of the second lens unit L2 at the wide angle end decreases beyond the lower limit of the conditional expression (3), an angle of view at the wide angle end narrows and it is difficult to sufficiently achieve a wide view angle. Accordingly, such a case is not preferable.

As described above, in each of the embodiments, each element is appropriately set so as to satisfy the conditional expressions (1) to (3). By doing so, a zoom lens having a small size, a wide view angle, a high zoom ratio, and excellent optical performance can be obtained.

In each of the embodiments, numerical ranges of the conditional expressions (1) to (3) are preferably set as follows:

$$2.80 < (\beta 34t/\beta 34w)/(\beta 2t/\beta 2w) < 10.00 \quad (1a)$$

$$3.80 < \beta 3t/\beta 3w < 11.00 \quad (2a)$$

$$-0.11 < \beta 2w < -0.02 \quad (3a)$$

The numerical ranges of the conditional expressions (1) to (3) are more preferably set as follows:

$$4.00 < (\beta 34t/\beta 34w)/(\beta 2t/\beta 2w) < 8.00 \quad (1b)$$

$$5.00 < \beta 3t/\beta 3w < 9.00 \quad (2b)$$

$$-0.09 < \beta 2w < -0.03 \quad (3b)$$

In each of the embodiments, it is still more preferable to satisfy one or more of the following conditional expressions:

$$1.84 < Nd2p < 2.30 \quad (4)$$

$$5.0 < \nu d2p < 25.0 \quad (5)$$

$$0.70 < TL1G/fw < 4.00 \quad (6)$$

$$-8.00 < f2/fw < -0.80 \quad (7)$$

$$0.20 < ((bfw+bft)/2)/\sqrt{(fw \times ft)} < 1.60 \quad (8)$$

$$0.90 < \beta 4t/\beta 4w < 2.00 \quad (9)$$

$$-3.50 < f21/\sqrt{(fw \times ft)} < -0.90 \quad (10)$$

Here, a refractive index of a material of a positive lens included in the second lens unit L2, with respect to the d-line, is denoted by Nd2p, an Abbe number thereof is denoted by νd2p, a sum of thicknesses along the optical axis of lenses included in the first lens unit L1 is denoted by TL1G, and a focal length of the zoom lens at the wide angle end is denoted by fw. A focal length of the second lens unit L2 is denoted by f2, a back focus of the zoom lens at the wide angle end is denoted by bfw, a back focus of the zoom lens at the telephoto end is denoted by bft, and a focal length of the zoom lens at the telephoto end is denoted by ft. A lateral magnification of the fourth lens unit L4 at the wide angle end is denoted by β4w, a lateral magnification of the fourth lens unit L4 at the telephoto end is denoted by β4t, and a focal length of the negative lens located closest to the object-side end in the second lens unit L2 is denoted by f21.

The back focus is a distance from a surface of a lens located closest to the image-side end to an image plane in the zoom lens, and indicated in terms of an air conversion length. When refractive indices of the material with respect to an F-line (486.1 nm), the C-line (656.3 nm), and the d-line (587.6 nm) are denoted by NF, NC, and Nd, respectively, the Abbe number νd is a numerical value represented by the following expression:

$$\nu d = (Nd-1)/(NF-NC).$$

The conditional expressions (4) and (5) define the material of a positive lens included in the second lens unit L2. In a case where a refractive index of the material of the positive lens included in the second lens unit L2 increases too much and exceeds the upper limit of the conditional expression (4), a real material which satisfies the numerical range of the conditional expression (5) is limited. Accordingly, such a case is not preferable. In a case where a refractive index of the material of the positive lens included in the second lens unit L2 decreases too much beyond the lower limit of the conditional expression (4), a lot of spherical aberrations occurs at the telephoto end. Accordingly, such a case is not preferable.

In a case where the Abbe number νd2p of the material of the positive lens included in the second lens unit L2 increases and exceeds the upper limit of the conditional expression (5), it is difficult to satisfactorily correct a lateral chromatic aberration occurring in the second lens unit L2. Accordingly, such a case is not preferable. In a case where the Abbe number νd2p of the material of the positive lens included in the second lens unit L2 decreases beyond the lower limit of the conditional expression (5), a real material which satisfies the numerical range of the conditional expression (4) is limited. Accordingly, such a case is not preferable.

The conditional expression (6) defines a ratio of TL1G, which is the sum of thicknesses along the optical axis of lenses included in the first lens unit L1, and fw, which is the focal length of the zoom lens at the wide angle end. In a case where the sum of thicknesses TL1G along the optical axis of lenses included in the first lens unit L1 increases and exceeds the upper limit of the conditional expression (6), the first lens unit L1 extends in an optical axis direction and thereby an overall lens length increases. Accordingly, such a case is not preferable. In a case where the sum of thicknesses TL1G along the optical axis of lenses included in the first lens unit L1 decreases beyond the lower limit of the conditional expression (6), it is necessary to increase a refractive power of each lens included in the first lens unit L1 in order to maintain the positive refractive power in the first lens unit L1. As a result, a lot of spherical aberrations occurs. Accordingly, such a case is not preferable.

The conditional expression (7) defines a ratio of f2, which is the focal length of the second lens unit L2, and fw, which is the focal length of the zoom lens at the wide angle end. In a case where the focal length f2 of the second lens unit L2 decreases beyond the upper limit of the conditional expression (7), the refractive power of the second lens unit L2 becomes too strong. As a result, a lot of field curvature and chromatic aberrations occur in an overall zoom range. Accordingly, such a case is not preferable. In a case where the focal length f2 of the second lens unit L2 increases beyond the lower limit of the conditional expression (7), the refractive power of the second lens unit L2 becomes too weak. As a result, it is difficult to achieve a wide view angle of the zoom lens, and the diameter of the first lens unit L1 increases. Accordingly, such a case is not preferable.

The conditional expression (8) defines a length of the back focus of the zoom lens. In a case where the length of the back focus at the wide angle end bfw, or that of the back focus at the telephoto end bft increases and exceeds the upper limit of the conditional expression (8), when the zoom lens is applied to an image pickup apparatus, a size of the image pickup apparatus increases. Accordingly, such a case is not preferable. In a case where the length of the back focus at the wide angle end bfw, or that of the back focus at the telephoto end bft decreases beyond the lower limit of the conditional expression (8), it is difficult to secure a space in which an optical block such as a low-pass filter and an infrared cut filter is located. Accordingly, such a case is not preferable.

The conditional expression (9) defines the magnification varying burden of the fourth lens unit L4. In a case where the magnification varying burden of the fourth lens unit L4 increases and exceeds the upper limit of the conditional expression (9), a moving amount of the fourth lens unit L4 increases when zooming is performed, and thereby a size of the whole system may increase. Accordingly, such a case is not preferable. In a case where the magnification varying burden of the fourth lens unit L4 decreases beyond the lower limit of the conditional expression (9), it is difficult to sufficiently achieve an increase in magnification. Accordingly, such a case is not preferable.

The conditional expression (10) defines f21, which is the focal length of the negative lens G21 located closest to the object-side end in the second lens unit L2. In a case where the focal length f21 of the negative lens G21 decreases beyond the upper limit of the conditional expression (10), the refractive power of the negative lens G21 becomes too strong. As a result, a lot of astigmatism and field curvature occur. Accordingly, such a case is not preferable. In a case where the focal length f21 of the negative lens G21 increases beyond the lower limit of the conditional expression (10), the refractive power of the negative lens G21 becomes too weak. As a result, the effective diameter of the front lens increases. Accordingly, such a case is not preferable.

Numerical ranges of the conditional expressions (4) to (10) are preferably set as follows:

$$1.90 < Nd2p < 2.10 \tag{4a}$$

$$10.0 < vd2p < 21.0 \tag{5a}$$

$$0.90 < TL1G/fw < 3.00 \tag{6a}$$

$$-5.00 \le f2/fw < -2.00 \tag{7a}$$

$$0.40 < ((bfw+bft)/2)/\sqrt{(fw \times ft)} < 1.40 \tag{8a}$$

$$0.95 < \beta 4t/\beta 4w < 1.50 \tag{9a}$$

$$-3.20 \le f21/\sqrt{(fw \times ft)} < -1.00 \tag{10a}$$

The numerical ranges of the conditional expressions (4) to (10) are more preferably set as follows:

$$1.92 < Nd2p < 2.00 \tag{4b}$$

$$12.0 < vd2p < 19.0 \tag{5b}$$

$$1.20 < TL1G/fw < 2.50 \tag{6b}$$

$$-4.00 \le f2/fw < -2.50 \tag{7b}$$

$$0.50 < ((bfw+bft)/2)/\sqrt{(fw \times ft)} < 0.90 \tag{8b}$$

$$0.98 < \beta 4t/\beta 4w < 1.20 \tag{9b}$$

$$-2.90 \le f21/\sqrt{(fw \times ft)} < -1.10 \tag{10b}$$

In addition, when the zoom lens according to the present disclosure is applied to an image pickup apparatus including an image pickup element which receives an image formed by the zoom lens, it is preferable to satisfy the following conditional expression:

$$0.50 < (\tan \omega W/\tan \omega T)/(\beta 3t/\beta 3w) < 1.70 \tag{11}$$

Here, a half angle of view at the wide angle end is denoted by ωW, and a half angle of view at the telephoto end is denoted by ωT.

In a case where the half angle of view ωW at the wide angle end increases and exceeds the upper limit of the conditional expression (11), a lot of distortion aberrations occurs at the wide angle end. Accordingly, such a case is not preferable. In a case of exceeding the lower limit of the conditional expression (11), shift in the focal length decreases when zooming is performed from the wide angle end to the telephoto end, and it is difficult to achieve an increase in magnification of the zoom lens. Accordingly, such a case is not preferable.

In each of the embodiments, a numerical range of the conditional expression (11) is preferably set as follows:

$$0.60 < (\tan \omega W/\tan \omega T)/(\beta 3t/\beta 3w) < 1.50 \tag{11a}$$

The numerical range of the conditional expression (11) is more preferably set as follows:

$$0.70 < (\tan \omega W/\tan \omega T)/(\beta 3t/\beta 3w) < 1.20 \tag{11b}$$

Next, a configuration of each lens unit will be described. In each of the zoom lenses according to the first and the third embodiment, a first lens unit L1 consists of a meniscus positive lens G11 having a convex surface on an object side thereof. With the positive lens G11 having a meniscus shape, off-axis light can be refracted gently, and thereby spherical aberration occurring in the first lens unit L1 can be reduced. In the zoom lens according to the second embodiment, a first lens unit L1 consists of a cemented lens in which a negative lens G11 and a positive lens G12 are cemented together. The negative lens G11 is a meniscus lens having a convex surface on an object side thereof, and the positive lens G12 is a meniscus lens having a convex surface on an object side thereof. With the positive lens and the negative lens located in the first lens unit L1, chromatic aberration is satisfactorily corrected in the first lens unit L1. When the negative lens G11 and the positive lens G12 are configured to be one lens element, the lens element can be thought to have, as a whole, a meniscus shape with a convex surface on an object side thereof. With the first lens unit L1 including the lens element having, as a whole, a meniscus shape with a convex surface on an object side thereof, off-axis light can be refracted gently, and thereby spherical aberration occurring in the first lens unit L1 can be reduced.

In the zoom lens according to each of the embodiments, the second lens unit L2 consists of, in order from an object side to an image side, a negative lens G21, a negative lens G22, a negative lens G23, and a positive lens G24. With the second lens unit L2 including three or more negative lenses located therein, a negative refractive power can be shared and occurrence of astigmatism and field curvature can be suppressed.

In the zoom lens according to the first embodiment, the negative lens G21 is a meniscus negative lens having a convex surface on an object side thereof, and the negative lens G22 is a meniscus negative lens having a convex surface on an object side thereof. The negative lens G23 is a negative lens having a biconcave shape, and the positive lens G24 is a meniscus positive lens having a convex surface on an object side thereof. In the zoom lens according to the second embodiment, the negative lens G21 is a meniscus negative lens having a convex surface on an object side thereof, and the negative lens G22 is a meniscus negative lens having a convex surface on an object side thereof. The negative lens G23 is a meniscus negative lens having a convex surface on an image side thereof, and the positive lens G24 is a positive lens having a biconvex shape. In the zoom lens according to the third embodiment, the negative lens G21 is a meniscus negative lens having a convex surface on an object side thereof, and the negative lens G22 is a meniscus negative lens having a convex surface on an object side thereof. The negative lens G23 is a negative lens having a biconcave shape, and the positive lens G24 is a positive lens having a biconvex shape.

In the zoom lens according to each of the embodiments, the third lens unit L3 consists of, in order from an object side to an image side, a positive lens G31, a negative lens G32, a positive lens G33, a negative lens G34, and a positive lens G35. In each of the embodiments, the negative lens G34 and the positive lens G35 are cemented together. In the zoom lens according to the second embodiment, the negative lens G32 and the positive lens G33 are cemented together. With the third lens unit L3 including two or more positive lenses and two or more negative lenses located therein, chromatic aberration can be corrected satisfactorily in the third lens unit L3.

In the zoom lens according to each of the embodiments, the positive lens G31 is a positive lens having a biconvex shape, the negative lens G32 is a meniscus negative lens having a convex surface on an object side thereof, and the positive lens G33 is a meniscus positive lens having a convex surface on an object side thereof. The negative lens G34 is a meniscus negative lens having a convex surface on an object side thereof, and the positive lens G35 is a positive lens having a biconvex shape.

In the zoom lenses according to the first and the third embodiments, the fourth lens unit L4 consists of a meniscus positive lens G41 having a convex surface on an image side thereof. In the zoom lens according to the second embodiment, the fourth lens unit L4 consists of, in order from an object side to an image side, a negative lens G41 having a biconcave shape, and a positive lens G42 having a biconvex shape.

In the zoom lens according to the third embodiment, the fifth lens unit L5 consists of a meniscus positive lens G51 having a convex surface on an image side thereof.

Next, lens data of first to third numerical embodiments respectively corresponding to the first to the third embodiments of the present disclosure will be given. In each of the numerical embodiments, i denotes the order of an optical surface counted from the object side. ri denotes a radius of curvature of an i-th optical surface (i-th surface), di denotes a distance between the i-th surface and an (i+1)-th surface, and ndi and vdi denote a refractive index and an Abbe number, respectively, of a material of the i-th optical member with respective to a d-line.

In addition, when eccentricity is denoted by K, aspherical coefficients are denoted by A4, A6, A8, and A10, and displacement in an optical axis direction at a height h from the optical axis is denoted by x with the use of a surface vertex as a reference, an aspherical shape is represented by the following expression:

$$x=(h^2/r)/[1+[1-(1+K)(h/r)^2]^{1/2}]+A4h^4+A6h^6+A8h^8+A10h^{10}.$$

In the expression, r denotes a paraxial radius of curvature. The indication of "e-Z" means "$10^{-Z}$".

In each of the embodiments, the back focus (BF) is a distance from a surface of a lens system located closest to the image-side end to an image plane, and is indicated in terms of an air conversion length. Table 1 indicates correspondence to the above-described conditional expressions in each of the numerical embodiments.

It is possible to make an effective image circle diameter (diameter of an image circle) at the wide angle end small in comparison to an effective image circle diameter at the telephoto end. The reason therefor is as follows: barrel-shaped distortion aberration which easily occurs at the wide angle side can be corrected by enlarging an image through image processing.

First Numerical Embodiment

| Unit mm | | | | |
|---|---|---|---|---|
| Surface data | | | | |
| Surface number | r | d | nd | vd |
| 1 | 26.749 | 3.90 | 1.63854 | 55.4 |
| 2 | 33.767 | (variable) | | |
| 3 | 24.714 | 0.90 | 2.00100 | 29.1 |
| 4 | 11.533 | 5.54 | | |
| 5 | 32.064 | 0.70 | 1.88300 | 40.8 |
| 6 | 11.142 | 5.95 | | |
| 7 | −20.869 | 0.70 | 1.49700 | 81.5 |
| 8 | 53.368 | 0.15 | | |
| 9 | 27.321 | 2.25 | 1.95906 | 17.5 |
| 10 | 578.026 | (variable) | | |
| 11 (aperture) | ∞ | 0.15 | | |
| 12* | 9.995 | 3.89 | 1.49710 | 81.6 |
| 13* | −27.095 | 0.15 | | |
| 14 | 9.127 | 0.50 | 1.69895 | 30.1 |
| 15 | 6.391 | 0.38 | | |
| 16 | 6.58 | 2.02 | 1.91082 | 35.3 |
| 17 | 8.358 | 1.16 | | |
| 18 | 17.803 | 0.45 | 2.00100 | 29.1 |
| 19 | 5.574 | 2.79 | 1.49700 | 81.5 |
| 20 | −24.123 | (variable) | | |
| 21* | −9.858 | 2.70 | 1.85135 | 40.1 |
| 22* | −8.589 | (variable) | | |
| 23 | ∞ | 1.20 | 1.51633 | 64.1 |
| Image plane | ∞ | | | |

-continued

| Unit mm |
|---|

Aspherical surface data

12th surface

K = 0.00000e+000    A4 = −6.67470e−005    A6 = −1.10112e−006
A8 = 2.62703e−008    A10 = −4.90138e−010

13th surface

K = 0.00000e+000    A4 = 1.21543e−004    A6 = −8.85126e−007
A8 = 2.27660e−008    A10 = −3.99041e−010

21st surface

K = 0.00000e+000    A4 = −1.66928e−004    A6 = 7.24031e−006
A8 = −2.20615e−007    A10 = 1.04619e−008

22nd surface

K = 0.00000e+000    A4 = 9.89242e−005    A6 = 3.96707e−006
A8 = −8.34099e−008    A10 = 3.58727e−009

Various data
Zoom ratio 7.7

|  | Wide angle | Intermediate | Telephoto |
|---|---|---|---|
| Focal length | 2.95 | 12.99 | 22.72 |
| F-number | 1.44 | 2.60 | 3.99 |
| Half angle of view | 59 | 13.8 | 7.97 |
| Image height | 3.2 | 3.2 | 3.2 |
| Total lens length | 77.74 | 77.21 | 79.50 |
| BF (in air) | 6.80 | 7.33 | 5.04 |

| Distance | Wide angle | Intermediate | Telephoto |
|---|---|---|---|
| d 2 | 0.8 | 25.53 | 20.82 |
| d10 | 41.2 | 6.43 | 1.1 |
| d20 | 1.45 | 10.96 | 23.29 |
| d22 | 3.2 | 3.73 | 1.44 |

Lens unit data

| Unit | Starting surface | Focal length |
|---|---|---|
| 1 | 1 | 165.7 |
| 2 | 3 | −9.5 |
| 3 | 12 | 13.4 |
| 4 | 21 | 39.6 |

Second Numerical Embodiment

| Unit mm |
|---|

Surface data

| Surface number | r | d | nd | vd |
|---|---|---|---|---|
| 1 | 47.87 | 2.10 | 1.8000 | 29.8 |
| 2 | 36.05 | 8.00 | 1.7200 | 50.2 |
| 3 | 67.178 | (variable) | | |
| 4 | 50.154 | 1.10 | 2.0010 | 29.1 |
| 5 | 13.118 | 7.18 | | |
| 6 | 91.532 | 0.90 | 1.7738 | 47.2 |
| 7* | 27.974 | 5.99 | | |
| 8 | −18.761 | 0.75 | 1.4970 | 81.5 |
| 9 | 112.039 | 0.15 | | |
| 10 | 118.133 | 3.21 | 1.9591 | 17.5 |
| 11 | −66.039 | (variable) | | |
| 12 (aperture) | ∞ | 0.15 | | |
| 13* | 17.056 | 4.58 | 1.5533 | 71.7 |
| 14* | −30.146 | 0.15 | | |
| 15 | 14.221 | 0.95 | 1.7380 | 32.3 |
| 16 | 9.537 | 3.22 | 1.9004 | 37.4 |
| 17 | 12.422 | 2.11 | | |
| 18 | 43.318 | 0.45 | 2.0010 | 29.1 |
| 19 | 8.886 | 3.96 | 1.4970 | 81.5 |
| 20 | −34.217 | (variable) | | |
| 21 | −23.465 | 0.75 | 1.5714 | 53 |
| 22 | 15.458 | 3.93 | | |
| 23* | 16.191 | 4.50 | 1.4971 | 81.6 |
| 24* | −10.275 | (variable) | | |
| 25 | ∞ | 1.20 | 1.5163 | 64.1 |
| Image plane | ∞ | | | |

Aspherical surface data

7th surface

K = 0.00000e+000    A4 = −1.84443e−005    A6 = −1.69533e−008
A8 = −2.16541e−010

13th surface

K = 0.00000e+000    A4 = −2.34765e−005    A6 = −7.09300e−009
A8 = 3.30611e−010    A10 = −3.15470e−012

14th surface

K = 0.00000e+000    A4 = 3.20188e−005    A6 = −1.42956e−008
A8 = 3.48574e−010    A10 = −2.84750e−012

23rd surface

K = 0.00000e+000    A4 = −6.61518e−005    A6 = −8.35993e−007
A8 = 1.31658e−008

24th surface

K = 0.00000e+000    A4 = 2.63639e−004    A6 = −2.04328e−006
A8 = 2.91282e−008

Various data
Zoom ratio 9.5

|  | Wide angle | Intermediate | Telephoto |
|---|---|---|---|
| Focal length | 4.4 | 24.54 | 41.81 |
| F-number | 1.64 | 3.13 | 4.84 |
| Half angle of view | 53.6 | 10 | 5.93 |
| Image height | 4.5 | 4.5 | 4.5 |
| Total lens length | 118.36 | 118.64 | 119.70 |
| BF (air) | 8.11 | 7.83 | 6.76 |

| Distance | Wide angle | Intermediate | Telephoto |
|---|---|---|---|
| d 3 | 0.75 | 34.76 | 22.11 |
| d11 | 61.82 | 8.53 | 1.9 |
| d20 | 1.66 | 21.22 | 41.57 |
| d24 | 3.5 | 3.22 | 2.15 |

Lens unit data

| Unit | Starting surface | Focal length |
|---|---|---|
| 1 | 1 | 210.4 |
| 2 | 4 | −13.0 |
| 3 | 13 | 19.6 |
| 4 | 21 | 24.5 |

Third Numerical Embodiment

| Unit mm |
|---|

| Surface number | r | d | nd | vd |
|---|---|---|---|---|
| 1 | 25.293 | 3.90 | 1.63854 | 55.4 |
| 2 | 29.828 | (variable) | | |
| 3 | 26.303 | 0.80 | 2.00100 | 29.1 |
| 4 | 9.864 | 6.14 | | |
| 5 | 564.528 | 0.70 | 1.88300 | 40.8 |
| 6 | 19.687 | 3.65 | | |
| 7 | −21.141 | 0.70 | 1.49700 | 81.5 |
| 8 | 39.568 | 0.15 | | |
| 9 | 28.677 | 3.17 | 1.95906 | 17.5 |

-continued

Unit mm

| | | | | |
|---|---|---|---|---|
| 10 | −245.532 | (variable) | | |
| 11 (aperture) | ∞ | 0.15 | | |
| 12* | 10.789 | 4.43 | 1.49710 | 81.6 |
| 13* | −26.68 | 0.15 | | |
| 14 | 12.741 | 0.50 | 1.65412 | 39.7 |
| 15 | 7.808 | 0.47 | | |
| 16 | 7.818 | 1.95 | 1.91082 | 35.3 |
| 17 | 12.648 | 0.97 | | |
| 18 | 21.413 | 0.45 | 2.00100 | 29.1 |
| 19 | 6.194 | 3.77 | 1.49700 | 81.5 |
| 20 | −28.064 | (variable) | | |
| 21* | −9.729 | 3.00 | 1.69350 | 53.2 |
| 22* | −10.45 | (variable) | | |
| 23 | −14.742 | 1.15 | 1.49700 | 81.5 |
| 24 | −8.92 | 1.00 | | |
| 25 | ∞ | 1.20 | 1.51633 | 64.1 |
| Image plane | ∞ | | | |

Aspherical surface data $12^{th}$ surface

K = 0.00000e+000　A4 = −6.61378e−005　A6 = −1.41031e−006
A8 = 3.40820e−008　A10 = −5.71142e−010

$13^{th}$ surface

K = 0.00000e+000　A4 = 9.02773e−005　A6 = −1.13400e−006
A8 = 3.03683e−008　A10 = −5.20683e−010

$21^{st}$ surface

K = 0.00000e+000　A4 = 6.40599e−004　A6 = 7.69572e−006
A8 = 2.55381e−007　A10 = −1.66126e−008

$22^{nd}$ surface

K = 0.00000e+000　A4 = 8.54693e−004　A6 = 3.92456e−006
A8 = 4.26617e−007　A10 = −1.39766e−008

Various data
Zoom ratio 8.2

| | Wide angle | Intermediate | Telephoto |
|---|---|---|---|
| Focal length | 2.91 | 11.57 | 23.71 |
| F-number | 1.51 | 2.40 | 3.99 |
| Half angle of view | 59.4 | 15.3 | 7.46 |
| Image height | 3.2 | 3.2 | 3.2 |
| Total lens length | 82.99 | 82.99 | 82.99 |
| BF (air) | 5.44 | 5.44 | 5.44 |

| Distance | Wide angle | Intermediate | Telephoto |
|---|---|---|---|
| d 2 | 1.71 | 24.84 | 15.52 |
| d10 | 41.79 | 8.44 | 1.1 |
| d20 | 1.36 | 11.6 | 29.48 |
| d22 | 1.95 | 1.91 | 0.7 |

Lens unit data

| Unit | Starting surface | Focal length |
|---|---|---|
| 1 | 1 | 195.1 |
| 2 | 3 | −8.6 |
| 3 | 12 | 14.0 |
| 4 | 21 | 288.8 |
| 5 | 23 | 42.7 |

TABLE 1

| | Conditional expression | First embodiment | Second embodiment | Third embodiment |
|---|---|---|---|---|
| (1) | (β34t/β34w)/(β2t/β2w) | 4.75 | 7.39 | 7.01 |
| (2) | β3t/β3w | 6.33 | 7.91 | 7.46 |
| (3) | β2w | −0.05 | −0.07 | −0.04 |
| (4) | Nd2P | 1.959 | 1.959 | 1.959 |
| (5) | νd2p | 17.5 | 17.5 | 17.5 |
| (6) | TL1G/fw | 1.32 | 2.30 | 1.34 |
| (7) | f2/fw | −3.21 | −2.96 | −2.97 |
| (8) | ((bfw + bft)/2)/√(fw × ft) | 0.72 | 0.55 | 0.65 |
| (9) | β4t/β4w | 1.05 | 1.06 | 1.00 |
| (10) | f21/√(fw × ft) | −2.73 | −1.33 | −1.95 |
| (11) | (tanωW/tanωT)/(β3t/β3w) | 0.91 | 0.97 | 0.83 |

Next, an embodiment regarding a monitoring camera (image pickup apparatus) using, as an image pickup optical system, the zoom lens according to the present disclosure will be described with the use of FIG. 7. In FIG. 7, reference numeral 10 denotes a monitoring camera main body, and reference numeral 11 denotes an image pickup optical system including any of zoom lenses described in the first to the third embodiments. Reference numeral 12 denotes a solid-state image pickup element (photoelectric conversion element) such as a CCD sensor and a CMOS sensor, which is accommodated in the camera main body and receives a subject image formed by the image pickup optical system 11. Reference numeral 13 denotes a memory which stores information regarding the subject image photoelectrically converted by the solid-state image pickup element 12. Reference numeral 14 denotes a network cable for transferring information stored in the memory 13.

By applying the zoom lens according to the present disclosure to an image pickup apparatus such as a monitoring camera, an image pickup apparatus which has a small size, a wide view angle, a high zoom ratio, and excellent optical performance can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-132145, filed Jun. 30, 2015, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a fourth lens unit having a positive refractive power,
   wherein a distance between adjacent lens units varies when performing zooming,
   when zooming is performed, the first lens unit is configured not to be moved, and at least the second lens unit and the third lens unit are configured to be moved, and
   when a lateral magnification of a composite lens system of the third lens unit and the fourth lens unit at a wide angle end is denoted by β34w, a lateral magnification of the composite lens system of the third lens unit and the fourth lens unit at a telephoto end is denoted by β34t, a lateral magnification of the second lens unit at the wide angle end is denoted by β2w, a lateral magnification of the second lens unit at the telephoto end is denoted by β2t, a lateral magnification of the third lens unit at the wide angle end is denoted by β3w, and a lateral magnification of the third lens unit at the telephoto end is denoted by β3t, the zoom lens is configured to satisfy the following conditional expressions:

$$2.20<(\beta 34t/\beta 34w)/(\beta 2t/\beta 2w)<15.00,$$

$$3.40<\beta 3t/\beta 3w<18.00, \text{ and}$$

$$-0.15<\beta 2w<-0.01.$$

2. The zoom lens according to claim 1,
wherein the second lens unit includes a positive lens and at least two negative lenses, and
when a refractive index of a material of a positive lens included in the second lens unit, with respect to a d-line, is denoted by Nd2p, and an Abbe number thereof is denoted by vd2p, at least one positive lens included in the second lens unit is configured to satisfy the following conditional expressions:

$$1.84<Nd2p<2.30, \text{ and}$$

$$5.0<vd2p<25.0.$$

3. The zoom lens according to claim 1, wherein when a sum of thicknesses along an optical axis of lenses included in the first lens unit is denoted by TL1G, and a focal length of the zoom lens at the wide angle end is denoted by fw, the zoom lens is configured to satisfy the following conditional expression:

$$0.70<TL1G/fw<4.00.$$

4. The zoom lens according to claim 1, wherein when a focal length of the second lens unit is denoted by f2, and a focal length of the zoom lens at the wide angle end is denoted by fw, the zoom lens is configured to satisfy the following conditional expression:

$$-8.00<f2/fw<-0.80.$$

5. The zoom lens according to claim 1, wherein when a back focus of the zoom lens at the wide angle end is denoted by bfw, a back focus of the zoom lens at the telephoto end is denoted by bft, a focal length of the zoom lens at the wide angle end is denoted by fw, and a focal length of the zoom lens at the telephoto end is denoted by ft, the zoom lens is configured to satisfy the following conditional expression:

$$0.20<((bfw+bft)/2)/\sqrt{(fw \times ft)}<1.60.$$

6. The zoom lens according to claim 1, wherein when a lateral magnification of the fourth lens unit at the wide angle end is denoted by β4w, and a lateral magnification of the fourth lens unit at the telephoto end is denoted by β4t, the zoom lens is configured to satisfy the following conditional expression:

$$0.90<\beta 4t/\beta 4w<2.00.$$

7. The zoom lens according to claim 1, wherein when a focal length of the zoom lens at the wide angle end is denoted by fw, a focal length of the zoom lens at the telephoto end is denoted by ft, and a focal length of a negative lens located closest to the object-side end in the second lens unit is denoted by f21, the zoom lens is configured to satisfy the following conditional expression:

$$-3.50<f21/\sqrt{(fw \times ft)}<-0.90.$$

8. The zoom lens according to claim 1, wherein the first lens unit consists of a meniscus positive lens having a convex surface on an object side thereof.

9. The zoom lens according to claim 1, wherein the first lens unit consists of a cemented lens in which a positive lens and a negative lens are cemented together, and in the cemented lens, a surface located closest to the object-side end has a convex shape, and a surface located closest to the image-side end has a concave shape.

10. The zoom lens according to claim 1, consisting of, in order from the object side to the image side:
the first lens unit having the positive refractive power;
the second lens unit having the negative refractive power;
the third lens unit having the positive refractive power; and
the fourth lens unit having the positive refractive power.

11. The zoom lens according to claim 1, consisting of, in order from the object side to the image side:
the first lens unit having the positive refractive power;
the second lens unit having the negative refractive power;
the third lens unit having the positive refractive power;
the fourth lens unit having the positive refractive power; and
a fifth lens unit having a positive refractive power.

12. An image pickup apparatus, comprising:
a zoom lens; and
an image pickup element configured to receive an image formed by the zoom lens,
the zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein a distance between adjacent lens units varies when performing zooming,
when zooming is performed, the first lens unit is configured not to be moved, and at least the second lens unit and the third lens unit are configured to be moved, and
when a lateral magnification of a composite lens system of the third lens unit and the fourth lens unit at a wide angle end is denoted by β34w, a lateral magnification of the composite lens system of the third lens unit and the fourth lens unit at a telephoto end is denoted by β34t, a lateral magnification of the second lens unit at the wide angle end is denoted by β2w, a lateral magnification of the second lens unit at the telephoto end is denoted by β2t, a lateral magnification of the third lens unit at the wide angle end is denoted by β3w, and a lateral magnification of the third lens unit at the telephoto end is denoted by β3t, the zoom lens is configured to satisfy the following conditional expressions:

$$2.20<(\beta 34t/\beta 34w)/(\beta 2t/\beta 2w)<15.00,$$

$$3.40<\beta 3t/\beta 3w<18.00, \text{ and}$$

$$-0.15<\beta 2w<-0.01.$$

13. The image pickup apparatus according to claim 12, wherein when a half angle of view at the wide angle end is denoted by ωW and a half angle of view at the telephoto end is denoted by ωT, the following conditional expression is satisfied:

$$0.50<(\tan \omega W/\tan \omega T)/(\beta 3t/\beta 3w)<1.70.$$

* * * * *